(12) United States Patent
Kim et al.

(10) Patent No.: US 7,734,067 B2
(45) Date of Patent: Jun. 8, 2010

(54) USER RECOGNITION SYSTEM AND METHOD THEREOF

(75) Inventors: Do-Hyung Kim, Daejeon (KR); Jae-Yeon Lee, Daejeon (KR); Ho-Sub Yoon, Gunsan (KR); Young-Jo Cho, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 906 days.

(21) Appl. No.: 11/291,605

(22) Filed: Dec. 1, 2005

(65) Prior Publication Data

US 2006/0204058 A1    Sep. 14, 2006

(30) Foreign Application Priority Data

Dec. 7, 2004    (KR) ............... 10-2004-0102472
Jun. 3, 2005    (KR) ............... 10-2005-0047773

(51) Int. Cl.
*G06K 9/00* (2006.01)
*G06K 9/46* (2006.01)
*G06K 9/66* (2006.01)
*G06K 9/62* (2006.01)
*G06K 5/00* (2006.01)
*G05B 19/00* (2006.01)

(52) U.S. Cl. ............... 382/115; 382/190; 382/225; 235/380; 340/5.1; 340/5.92

(58) Field of Classification Search ......... 382/115–127, 382/190, 225; 235/380; 340/5.1–5.92
See application file for complete search history.

(56) References Cited

U.S. PATENT DOCUMENTS 5,850,470 A * 12/1998 Kung et al. ............... 382/157

FOREIGN PATENT DOCUMENTS

EP         1343115       9/2003
KR    1020040038617      5/2004

OTHER PUBLICATIONS

Huang et al.,"Face Recognition by Incremental Leaning for Robotic Iteration", 2002, IEEE , pp. 280-283.*
Weimin Huang et al; "Face Recognition by Incremental Learning for Robotic Interaction" , Multimedia Signal Processing, 2002 IEEE Workshop on Volume, Issue, Dec. 9-11, 2002 pp. 280-283.

* cited by examiner

*Primary Examiner*—Anand Bhatnagar
*Assistant Examiner*—Randolph Chu
(74) *Attorney, Agent, or Firm*—Ladas & Parry LLP

(57) ABSTRACT

In realizing a user recognition system and a method thereof, a user feature vector is extracted from an input facial image, and at least one cluster is generated and a user feature template is enrolled. The cluster includes the feature vector as a member of it. When a user facial image is inputted, a user feature vector is extracted from the image, and a similarity between the feature vector and the user feature template is calculated. When the similarity is greater than a predetermined threshold value, a user of the user feature template is recognized as the user of the input image.

20 Claims, 5 Drawing Sheets

USER RECOGNITION SYSTEM AND METHOD THEREOF

CROSS-REFERENCE TO RELATED APPLICATION

This application claims priority to and the benefit of Korean Patent Application No. 10-2004-0102472 filed in the Korean Intellectual Property Office on Dec. 07, 2004, and Korean Patent Application No. 10-2005-0047773 filed in the Korean Intellectual Property Office on Jun. 3, 2005, the entire contents of which are incorporated herein by reference.

BACKGROUND OF THE INVENTION

1. Field of the Invention

This application relates generally to a user recognition system and a method thereof, and more particularly to a user recognition system recognizing a user from an input facial and/or other bodily feature image(s) and a method thereof.

2. Description of the Prior Art

Concerning communication and interaction between a human and a robot, it is vital for the robot to recognize a human. With such a capability to recognize, the robot can authorize a recognized user and may provide customized service for each recognized individual user.

The biometrics technology, which is based on the physical and behavioral features of a human body, is considered to be a very promising method of recognizing a user. There are several biometrics methods including face recognition, voice recognition, gait recognition, etc. that are applied to recognize a user by a robot or a machine. The face recognition is the most commonly used human recognition method implemented in a robot system or machine since a user need not come in close contact with the machine, and thus the face recognition method is advantageous for its ability for remote recognition.

Similar to other recognition methods, the face recognition method has been studied for its use in security systems. Many types of the face recognition method that have been studied up to now are broadly classified into the feature matching algorithm and the template matching algorithm. The mainstream face recognition methods include Principal Component Analysis (PCA), Elastic Bunch graph matching, Linear Discrimination Analysis (LDA), and Local Feature Analysis (LFA), and various studies have proven that all these given methods are highly effective in face recognition.

However, as it has been revealed from the various studies, the above-mentioned face recognition methods are vulnerable to environmental factors such as lighting conditions and pose variations of a user. These studies that achieved excellent recognition performance results in face recognition were conducted under a well-controlled environment (i.e., consistent lighting, front face, etc.). Under the well-controlled environment, a user to be recognized by a robot would face the robot in front, and the lighting conditions would be similar to the lighting conditions when the user is enrolled by the robot.

However, the lighting conditions and the user poses will vary in an environment where humans and a mobile robot dynamically interact with each other, and thus it is difficult to maintain the same lighting condition and pose. A conventional face recognition method focused on a security system requires a user to be cooperative. However, it would be difficult to expect a user to look for a robot and to become cooperative when the robot continually monitors the images in order to recognize the user identifications.

Although there are various conventional methods dealing with recognition of facial appearances under varying lighting and user pose conditions, the process for carrying out the conventional methods is too complex and difficult to realize in real-time.

Any effective face recognition method has to overcome the expected and problematic environmental variations when the method is applied to a mobile robot.

The disclosure in this Background section is intended only for enhancement of understanding of the background of the invention and may contain information that are not prior art.

SUMMARY OF THE INVENTION

Against this backdrop, embodiments of the present invention have been developed. The system recognizing a user from an input image according to the present invention includes at least a database, a feature vector calculator, a user feature information enroller, and a user recognizer. A database stores a user feature template as user feature information. A feature vector calculator extracts a user feature vector from the input image. A user feature information enroller generates a plurality of clusters having the feature vector as a member of the cluster and stores a user feature template including the plurality of clusters in the database. A user recognizer calculates similarities between the feature vector and the stored user feature template and recognizes a user of the user feature template as a user of the input image when the similarity exceeds a predetermined recognition threshold value.

The user recognizer compares a similarity between the feature vector and the stored user feature template and controls the user feature information enroller to generate a user feature template and store the cluster in the database when the similarity does not exceed the recognition threshold value.

The user recognizer calculates a similarity between the user feature template and the user feature vector by comparing a similarity between each cluster of the user feature template and the user feature vector. The user recognizer calculates a highest similarity between the user feature template and the user feature vector by calculating similarities between each of the clusters and the user feature vector when a user feature template includes a plurality of clusters. The user recognizer, when the highest similarity exceeds the recognition threshold value, recognizes an enrolled user of the user feature template as a user of the input image.

The cluster having a feature vector as a member of the cluster is generated at least once, and a similarity between the feature vector and a centroid of each cluster exceeds a predetermined cluster classification threshold value.

The system recognizing a user from an input image according to the present invention further includes a tracking unit, a re-verification unit, and a user feature information update unit.

The tracking unit captures an input image of a user when the user is recognized. The re-verification unit calculates a feature vector from the captured image and calculates a similarity between the feature vector and a user feature template of the recognized user. The re-verification unit re-verifies whether the captured image corresponds to an input image of the recognized user when the similarity exceeds a predetermined update threshold value. A user feature information update unit updates a user feature template stored in the database with the captured image when the captured image corresponds to the input image of the recognized user. The update threshold value is set to be greater than the recognition threshold value.

The user feature information update unit calculates similarities between feature vectors of the captured images and clusters of a user feature template of the recognized user and searches for a winner cluster having the highest similarity, and compares a similarity between the corresponding feature vector and the winner cluster and a predetermined cluster classification threshold value. The user feature information update unit adds the corresponding feature vector as a member of the winner cluster when a similarity between the corresponding feature vector and the winner cluster is greater than the predetermined cluster classification threshold value. The user feature information update unit generates a cluster and adds the corresponding feature vector as a member of the generated cluster when the similarity between the corresponding feature vector and the winner cluster is not greater than the predetermined cluster classification threshold value.

The user feature information update unit sets a centroid of the cluster including the additional member, and removes a member corresponding to the reset centroid from the winner cluster when total members of the winner cluster exceed a predetermined maximum number of cluster members.

The user feature information update unit selects a cluster to be removed from among clusters of the user feature template based on at least more than one cluster having the highest mean similarity with other clusters and the least referred cluster in the user recognition process, and removes the selected cluster from the user feature template when a cluster is added and a total number of clusters exceed the predetermined maximum number of cluster members.

When the cluster has a plurality of members, a centroid of the cluster corresponds to a feature vector having the greatest sum of similarities between the feature vector and the plurality of members of the cluster, and the centroid is derived from the following equation:

$$C_k = \mathrm{argmax}_{i=0,m} \sum_{j=0}^{m} S(F_i, F_j), \quad i \neq j \text{ and } F_i, F_j \in C_k$$

where $C_k$ is a cluster, $c_k$ is a centroid of the cluster $C_k$, and $F_i$ and $F_j$ are feature vectors.

A similarity between the user feature template and the user feature vector is calculated from the following equation:

$$S_k = \max_{i=0,m} S(F_q, c_i), \quad c_i \in C_i \text{ and } C_i \in T_k$$

where $S_k$ is a: similarity, $C_i$ is a cluster, $c_i$ is a centroid of the cluster $C_i$, and $F_q$ is a feature vector)

A cluster having the highest mean similarity among other clusters of the user feature template is calculated from the following equation:

$$C_p = \mathrm{argmax}_{i=0,m} \frac{\sum_{j=0}^{m} S(C_i, C_j)}{m-1} \quad i \neq j \text{ and } C_i, C_j \in T_p$$

where $T_p$ is a template of user P, $C_i$, $C_j$ are clusters of the template $T_p$, and the cluster $C_p$ is a centroid cluster of the template $T_p$.

A cluster to be removed is selected by the following equation:

$$C_d = \mathrm{arg\,max}_{i=0,n}(\alpha(1-C_{ri}) + (i-\alpha)C_{si})$$

where $C_{ri}$ is a contribution degree of the i-th cluster, $C_{si}$ is a mean similarity between the i-th cluster and other clusters, and $\alpha$ is a weight value.

These and various other features as well as advantages which characterize the present invention will be apparent from a reading of the following detailed description and a review of the associated drawings.

DETAILED DESCRIPTION

The present invention has been made in an effort to provide a user face recognition method having advantages of recognizing a user under varying lighting and user pose conditions.

In an embodiment of the present invention, there is provided a system recognizing a user from an input image. The system includes a database, a feature vector extractor, a user feature information enroller, and a user recognizer. The database stores a user feature template as user feature information. The feature vector extractor extracts a user feature vector from the input facial image. The user feature information enroller generates a plurality of clusters having the feature vector as a member of the cluster and stores a user feature template including the plurality of clusters in the database. The user recognizer calculates a similarity between the feature vector and the stored user feature template, and recognizes a user of the feature template as a user of the input image when the similarity exceeds a predetermined recognition threshold value.

In another embodiment of the present invention, there is provided a method for recognizing a user from an input facial image. The method including:

a) extracting a user feature vector from the input image;

b) calculating a similarity between the extracted feature vector and a user feature template, the user feature template being user feature information that includes a cluster having a feature vector as a member of the cluster; and c), recognizing an enrolled user of the feature template as an input user when the similarity between the extracted user feature vector and the feature template exceeds a predetermined recognition threshold value.

Unlike the conventional face recognition method, the face recognition under various lighting conditions and poses becomes available according to various embodiments of the present invention.

In addition, the present invention provides a robot with a learning ability through the user feature information update process, and accordingly the robot successfully recognizes the identity of a user who frequently contacts with the robot. As a result, a memory mechanism similar to that of a human can be applied to an intelligent robot for human-level recognition ability.

For ease of description, an exemplary embodiment will now be described in detail in connection with face recognition for identifying of a user, but this invention is not restricted to recognition of just faces. Other physical features may also be the objects of recognition for recognizing the identity of a user according to this and other embodiments of the present invention.

Figure 1:
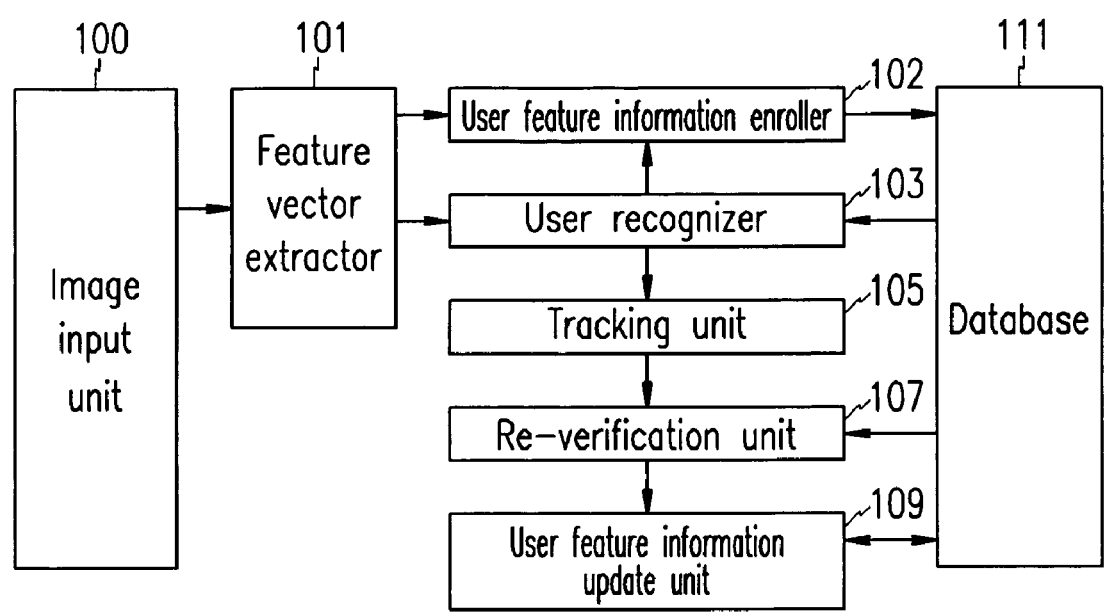
FIG. 1 is a schematic diagram of a user recognition system according to an exemplary embodiment of the present invention.

As shown in FIG. 1, a user recognition system includes an image input unit 100, a feature vector extractor 101, a user feature information enroller 102, a user recognizer 103, a tracking unit 105, a re-verification unit 107, a user feature information update unit 109, and a database 111 according to an exemplary embodiment of the present invention.

The image input unit 100 inputs an image of a user to be recognized. The feature vector extractor 101 preprocesses the input image and extracts a facial region from the image of the user transmitted from the image input unit 100. In addition, the feature vector extractor 101 extracts a feature vector from the facial region through a series of the preprocessing processes.

The preprocessing processes are broadly divided into a geometric normalization process and an image quality enhancement process. During the Euclidean normalization process, rotation and scaling are performed using information on general positions of the eyes, and a given region of a face is cut off based on the positions of the eyes. During the image quality improvement process, masking for eliminating background interference, histogram equalization, and normalization are performed for eliminating lighting interference.

The preprocessed facial region is then further processed to extract a feature vector of the facial image according to various facial feature extraction algorithms such that the feature vector most appropriately represents the corresponding face.

The user feature information enroller 102 enrolls the user feature information in the database 111. Herein, the user feature information is called a user feature template, and the template is stored in as a plurality of image clusters, each cluster having a feature vector as a member of the cluster.

Figure 2:
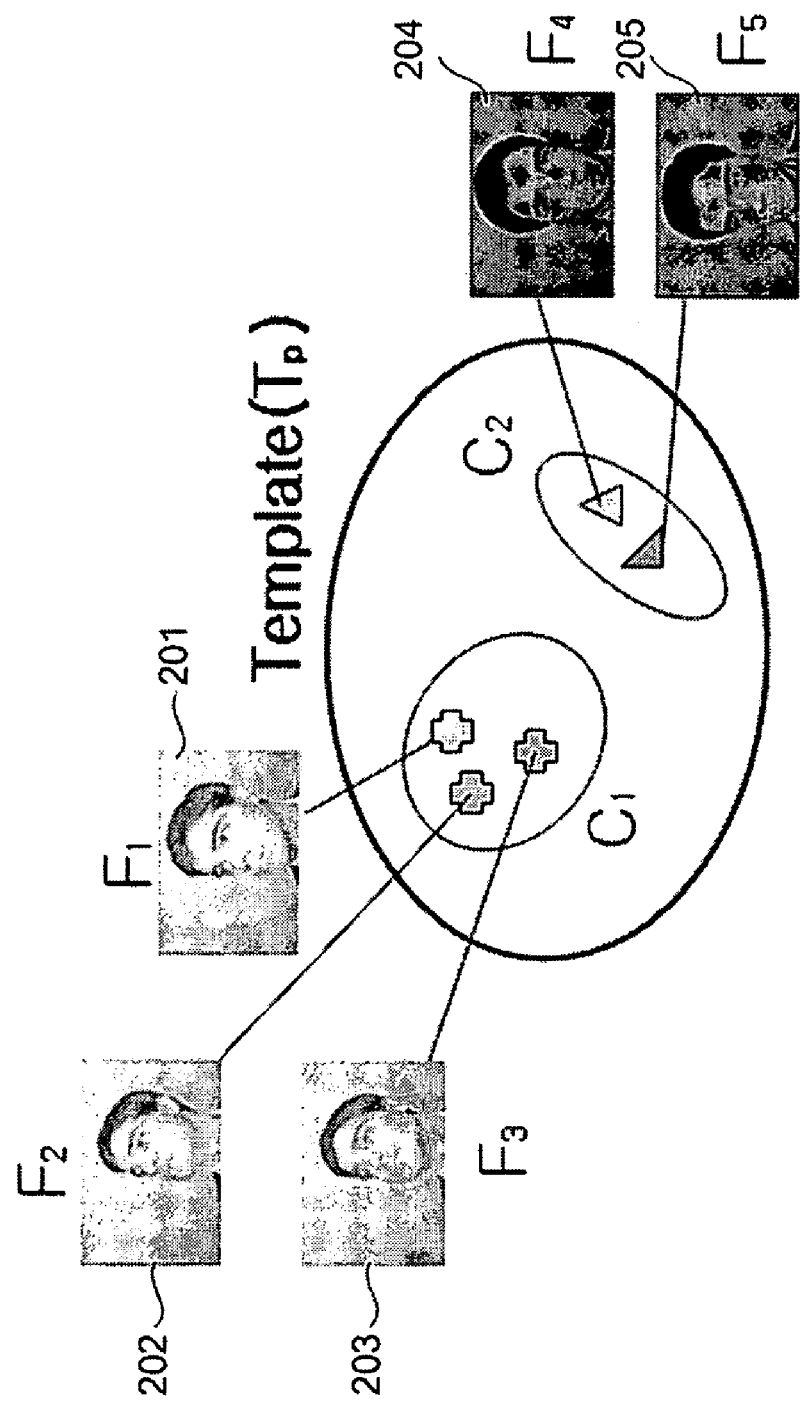
FIG. 2 shows a concept of a template and cluster of user feature information according to an exemplary embodiment of the present invention.

An example of this is shown in FIG. 2. The user feature information enroller 102 may enroll the Template ($T_p$) as shown in FIG. 2. The Template ($T_p$) is made up of a plurality of clusters including $C_1$ and $C_2$. In the cluster $C_1$, three feature vectors $F_1, F_2, F_3$ are members of the cluster $C_1$. Likewise, the feature vectors $F_4, F_5$ are members of the cluster $C_2$.

Explained more in detail while referring to FIGS. 1-2, when the preprocessing processes are performed for the 5 original facial images 201, 202, 203, 204, 205 of a user, and the 5 feature vectors $F_1, F_2, F_3, F_4, F_5$ are extracted from the 5 facial images 201, 202, 203, 204, 205, the user feature information enroller 102 first generates a primary cluster using the 5 feature vectors, $F_1, F_2, F_3, F_4, F_5$.

In more detail, when the feature vector is set as $F=\{F_i, i=1, 2, 3, 4, 5\}$, that is, $F_1, F_2, F_3, F_4, F_5$ as shown in FIG. 2, the user feature information enroller 102 generates a first cluster $C_1$ and sets a first feature vector $F_1$ as a member of the first cluster $C_1$. $F_1$ then becomes a centroid $c_1$ of the first cluster $C_1$, since $F_1$ at this point is the only member of the first cluster $C_1$.

Subsequently, the user feature information enroller 102 calculates the similarity $S(c_1, F_2)$ between the centroid $c_1$, (which is $F_1$ at this point) of the first cluster $C_1$ and a second feature vector $F_2$. At this time, when the similarity is greater than a predetermined cluster classification threshold value $\theta_c$, the feature vectors $F_1$ and $F_2$ are determined to be face feature vectors having similar characteristics. A similarity between two feature vectors may be obtained by various algorithms known to those skilled in the art, and Equation 1 is exemplarily used for calculating the similarity between the two feature vectors.

$$S(A, B) = \frac{A}{\|A\|} \cdot \frac{B}{\|B\|} \quad \text{[Equation 1]}$$

At this time, when the similarity is greater than a predetermined cluster classification threshold value $\theta_c$, the feature vectors $F_1$ and $F_2$ are determined to be face feature vectors having similar characteristics. The classification threshold value has a range of 0 to 1, and the predetermined threshold value $\theta c$ is set within the range.

Then, the user feature information enroller 102 adds $F_2$ to $C_1$ as a member of $C_1$, which now has $F_1$ and $F_2$ as the members of the cluster.

Thereafter, the user feature information enroller 102 calculates the new centroid $c_1$ of $C_1$ (which now has $F_1$ and $F_2$ as members) using Equation 2.

$$C_k = \mathrm{argmax}_{i=0,m} \sum_{j=0}^{m} S(F_i, F_j), \; i \neq j \text{ and } F_i, F_j \in C_k \quad \text{[Equation 2]}$$

According to Equation 2, when calculating similarities between the feature vectors in a cluster $C_k$ with another feature vector not already in the cluster $C_k$, a centroid $c_k$ for the cluster $C_k$ is calculated by Equation 2 as being equivalent to a feature vector having the highest similarity with any and all of the other members in the cluster $C_k$.

In the case of the above example when there are only two feature vector members in a cluster, one of the two members $F_1$ and $F_2$ of the cluster $C_1$ is randomly set to be the centroid $c_1$ of the cluster $C_1$ initially, since the cluster $C_1$ has only two feature vector members, $F_1$ and $F_2$. Assuming that one of $F_1$ and $F_2$ has been randomly chosen as the centroid $c_1$ of the cluster $C_1$, the similarity $S(c_1, F_3)$ between the centroid $c_1$ and a third feature vector $F_3$ is calculated in the similar manner described above. If the calculated $S(c_1, F_3)$ is greater than the predetermined cluster classification threshold value $\theta_c$, the first cluster $C_1$ will add $F_3$ as a new member of the cluster $C_1$, which will then have three members $F_1, F_2$, and $F_3$, and a new centroid $c_1$ will then be determined by Equation 2. Here, the new centroid $c_1$ is a calculated feature vector having the highest similarities to each and all of the features vector members, $F_1, F_2, F_3$ in the cluster $C_1$. At this stage, the cluster $C_1$ would have $F_1$, $F_2, F_3$, and $c_1$ as members.

Then, the similarity $S(c_1, F_4)$ between the new centroid $c_1$ and a fourth feature vector $F_4$ is calculated in the similar manner described above. When the similarity $S(c_1, F_4)$ between a fourth feature vector $F_4$ and $c_1$ is smaller than $\theta_c$, the feature vector $F_4$ is then determined to be different from the members $F_1, F_2$, and $F_3$ of the first cluster $C_1$. A second cluster $C_2$ is then generated next, and the fourth feature vector $F_4$ becomes a member of the second cluster $C_2$.

By these processes, the user feature template $T_p$ as shown in FIG. 2 may include a plurality of clusters (such as $C_1$ and $C_2$), and the feature vector members and a continually calculated centroid $c_1$ or $c_2$ in each of the clusters $C_1$ and $C_2$. $C_1$ and $C_2$ respectively represent an enrolled user in two different poses and lighting conditions, even though both of the first and second clusters $C_1$ and $C_2$ represent the same user, as shown in FIG. 2. By the same processes above, additional clusters such as $C_3, C_4, C_5$, etc. can be generated into the template $T_p$ so that each cluster represent yet further different poses and lighting conditions of the same user. Accordingly, the user feature template $T_p$ having a plurality clusters $C_1, C_2, C_3, C_4, C_5$, etc. is completed. These user feature template $T_p$ is then stored in the database 111 (FIG. 1).

Now referring to FIG. 1, the user recognizer 103 utilizes the user feature template(s) $T_p(s)$ stored in the database 111 to recognize a user, whose user feature template is also stored in the database 111 by the user feature information enroller 102. The user recognizer 103 recognizes a user through a face recognition process A of FIG. 3.

That is, when a user who is enrolled in a recognition system in a robot 302 or other machines designed for user recognition interacts with the robot 302, the images of the user will be inputted to the recognition system and thereafter a number of feature vectors $F_q$ where q is 1, 2, 3, 4, 5 ... is extracted from each image through the facial image extraction and the pre-processing processes in the manner described above as shown in FIG. 3, 304, 306, 314.

The user recognizer 103 then calculates the similarities between the each of the feature vectors $F_q$ and the centroid (which is the member with most similarities to the rest of the member in the given cluster) in each of the respective templates of the n enrolled users already stored in the database 111, and then makes the determination of recognizing the user with reference to the calculated similarities.

The similarity between any one of the feature vectors $F_q$ and a template $T_k$ of the k-th enrolled user ($1 \leq k \leq n$) among the n enrolled users in the database 111 is calculated by Equation 3.

$$S_k = \max_{i=0,m} S(F_q, c_i), c_i \epsilon C_i \text{ and } C_i \epsilon T_k \qquad \text{[Equation 3]}$$

That is, when the template $T_k$ includes a total of m clusters, each cluster will have a centroid $c_i$. The user recognizer 103 performs a matching process on every one of the feature vectors $F_q$ only with a centroid $c_i$ in each cluster (i.e., $C_1, C_2, C_3, \ldots C_m$). Each cluster includes feature vectors as members having high similarities with each other, and a centroid of a particular cluster is set as the feature vector having the greatest sum of similarities between any and all members of the cluster, and thus, the centroid of a cluster most appropriately represents the characteristics of the cluster. Then the highest calculated similarity in each template (i.e., $T_1, T_2, T_3, \ldots T_k, \ldots T_n$) is determined by the Equation 3 (i.e., $S_i, S_2, S_3, \ldots S_k, \ldots S_n$).

Figure 3:
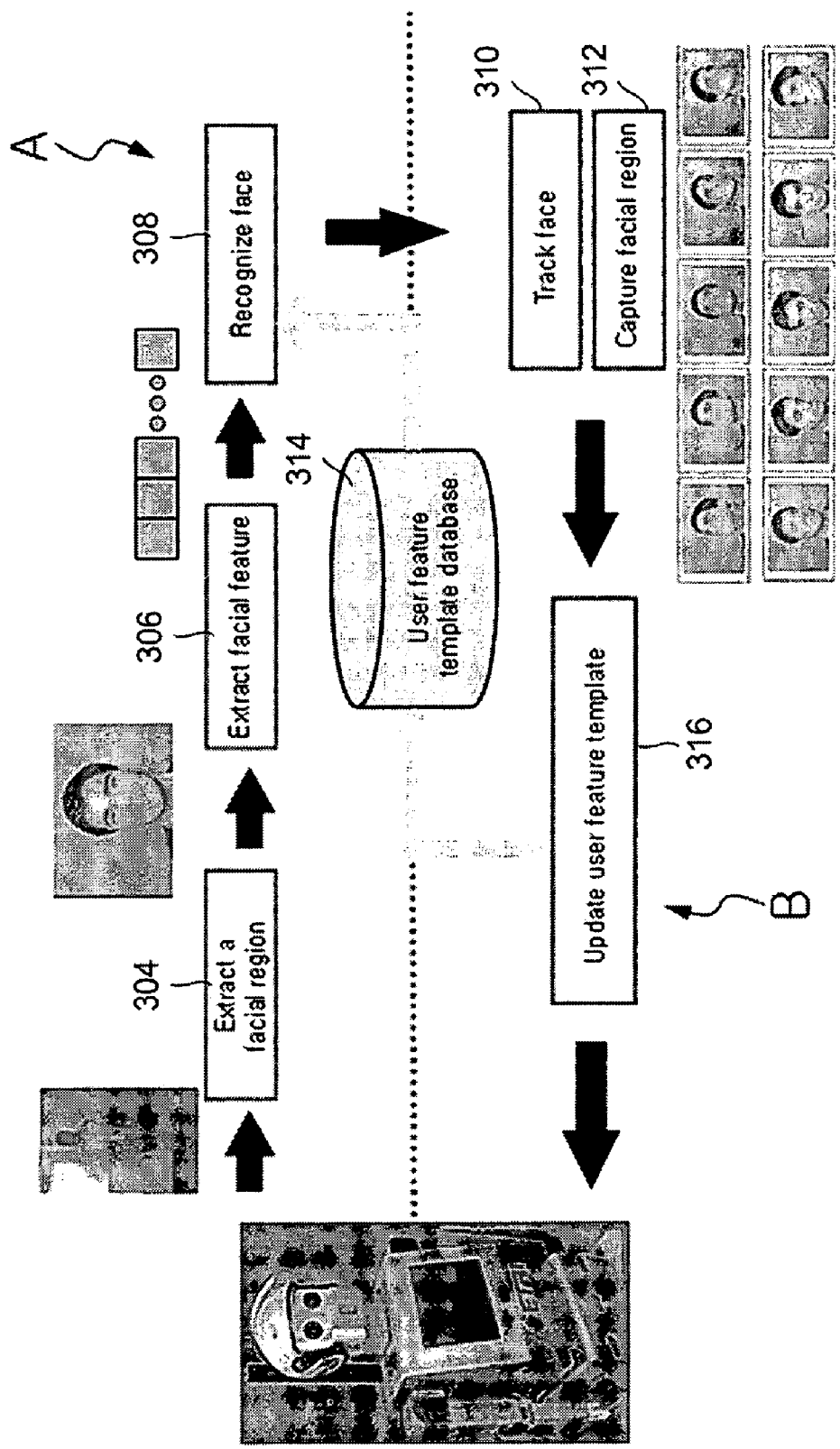
FIG. 3 shows a user recognition process and a user feature information update process according to an exemplary embodiment of the present invention.

When the highest calculated similarity $S_k$ of the kth template Tk among n similarities (i.e., $S_1, S_2, S_3, \ldots Sk, \ldots Sn$) calculated by Equation 3 is greater than a recognition threshold value θr, the user "k" having the highest similarity $S_k$ among the n number of users corresponds to the user who is supposed to be recognized by the robot. These processes are generally represented in FIG. 3, element 308.

In case the highest calculated similarity $S_k$ is smaller than the recognition threshold value θr, the corresponding user "k" is regarded as an unidentified user who's feature information (or the user template $T_k$) has not yet been is enrolled in the database 111, and thus the calculated user feature template for the user may be enrolled in the database by the user feature information enroller 102 (FIG. 1).

Referring back again to FIG. 1, the tracking unit 105 tracks the recognized user (for example, the user "k"). That is, for example, when a highest similarity between $F_q$ and a user feature template $T_k$ stored in the database 111 is determined to be Sk; and when that similarity $S_k$ is also determined to be the highest similarity among the n calculated similarities ($S_1, S_2, S_3, \ldots S_k, \ldots S_n$) of the n users; and when the highest similarity $S_k$ exceeds the recognition threshold value θr, the user "k" is recognized by the user recognizer 103. After recognition of the user (e.g., the user "k"), the user recognizer does not continue performing the recognition process on the inputted images of the user "k". The tracking unit 105 then performs a user tracking process.

The tracking unit 105 captures user images provided from the image input unit 100 and stores the user images in a temporary buffer. In addition, when the recognized user (for example, the user "k") goes out of the robot's vision or when an unrecognizable user appears in front of the robot's vision, the tracking unit 105 is not able to track the unrecognized user and thus terminates the user tracking process.

In a general face recognition process, a recognition process is terminated after a user to be recognized is recognized. However, a system that continually monitors users for recognizing identifications of users requires a tracking process. Thus, facial images captured through the tracking process are classified into facial images of the recognized user even though the recognition process is not continually performed. The facial images captured through the tracking process are accumulated such that a human-like learning process may be applied to the robot. In such a way, recognition performance of the robot can be improved. This is shown in FIG. 3, elements 310, 312.

When the tracking unit 105 terminates the tracking process, the re-verification unit 107 verifies again whether the facial images captured by the tracking unit 105 correspond to the facial images of the recognized user.

The re-verification unit 107 extracts feature vectors $F = \{F_i, i=1, 2, 3, \ldots, n\}$ from the captured images, and calculates a similarity $S_i$ between the feature factor $F_i$ and a template $T_p$ of the recognized user using Equation 4.

$$S_i = \max_{j=0,m} S(F_i, c_j), c_j \epsilon C_j \text{ and } C_j \epsilon T_p \qquad \text{[Equation 4]}$$

That is, the re-verification unit 107 calculates the respective similarities $S = \{S_i, i=1, 2, 3, \ldots, n\}$ between the template $T_p$ having m clusters and n feature vectors. At this time, when the similarity $S_i$ is greater than a template update threshold value θt (FAR=0), the template $T_p$ is updated with the feature vectors extracted from the images captured by the tracking unit 105.

However, the re-verification unit 107 removes the captured images from the buffer and a template update process is not performed when the similarity $S_i$ is not greater than the template update threshold value θt. This is shown in FIG. 3, elements 314, 316.

Since a template update error is considered more fatal than a recognition error, the update threshold value θt is set more strictly than the user recognition threshold value θr to verify the user to be recognized during the tracking process.

In the system, a user recognition error may occur depending on environmental variations, but the error is not accumulated. In addition, the error can be corrected by performing the recognition process again or by performing a retraining process on the system. However, when a template of a user A is updated with the facial features of a user B, the template may not stay attached to the user A and the user B may be misrecognized as the user A. Although numerous attempts have been made through preceding update processes for recognition reinforcement, a result of the template update process may not be trusted once an error occurs during the update process.

When the facial features captured by the tracking unit 105 are re-verified to be the same as the facial features of the recognized user P, the user feature information update unit 109 updates a template of the user P with the re-verified feature vectors through a template update process B of FIG. 3.

Figure 4:
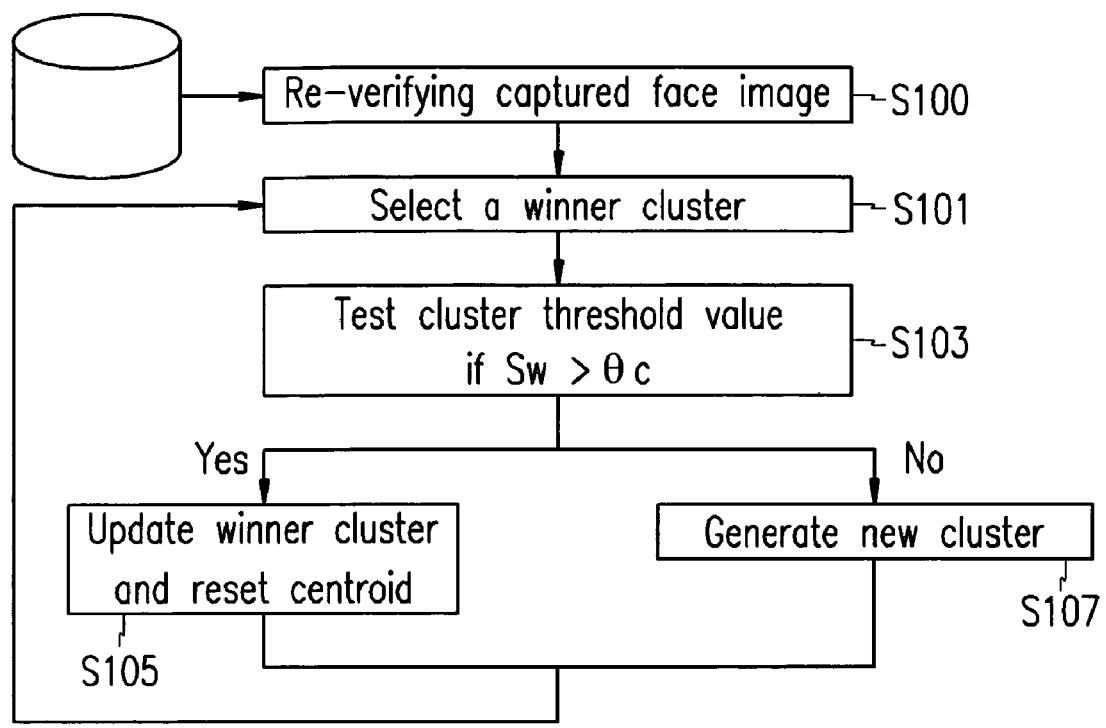
FIG. 4 is a flowchart of a template update process according to an exemplary embodiment of the present invention.

In more detail, as shown in FIG. 4, when the facial image captured by the tracking unit 105 is re-verified to be the same as the facial image of the recognized user P in step S100, the user feature information update unit 109 calculates the similarity between a feature vector $F_i$ and every cluster $C_j$ of a template $T_p$ of the user P and searches for a winner cluster $C_w$ having the highest similarity in step S101. Subsequently, a similarity $S_w$ between $C_w$ and $F_i$ is compared to the cluster classification threshold value $\theta c$ in step S103.

At this time, $F_i$ is regarded as a feature vector, which is similar to members of $C_w$ in characteristics, and thus is included as a member of $C_w$, and a centroid $c_w$ of $C_w$ is reset using Equation 2 in step S105 when the similarity $S_w$ is greater than the cluster classification threshold value $\theta c$.

At this time, when the number of members of $C_w$ exceeds a maximum number MAX_MEMBER$_{13}$ LIMIT (=10, for example) when $F_i$ is included in $C_w$, a member corresponding to the centroid $c_w$, which is reset when $F_i$ is included in $C_w$, is removed and the centroid $c_w$ is reset using Equation 2.

In addition, when $S_w$ is less than the cluster classification threshold value $\theta c$, $F_i$ is regarded as a feature vector that is different from the existing clusters of the template $T_p$ and a new cluster $C_n$ is generated. The cluster $C_n$ includes $F_i$ as its member, and $F_i$ is set as a centroid $c_n$ of $C_n$ in step S107.

The user feature information update unit 109 performs a template update process for n feature vectors in a manner like the above. Through such an update process, the robot learns features of the user P depending on variations of lighting conditions and poses, and performs improved recognition as it interacts with a user more often. Such a learning ability is an essential quality of the robot, and a facial feature template update algorithm for face recognition according to an embodiment of the present invention provides the robot with the learning ability.

On the other hand, the recognition performance of the system may be improved as the template is continually updated, and at the same time, the number of clusters of a template may be increased. The hardware capability and performance are continuously improved, and the number of users to be recognized, especially by a robot, is small. However, an increase of clusters having similar characteristics may increase a necessary memory space and cause a response delay. Therefore, the user feature information update unit 109 sets a limit on a total number of clusters and effectively replaces clusters.

For example, the user feature information update unit 109 replaces a cluster after a cluster is generated during the template update process and thus a total number of clusters exceeds a predetermined maximum number of clusters MAX_CLUSTER_LIMIT (=20, for example).

At this time, a cluster to be replaced may be selected in consideration of the following conditions.

First, when a user P is recognized, a contribution degree of a cluster that has a highest similarity with a feature vector of an input facial image may be calculated. The contribution degree corresponds to a result of dividing a total number of times that the user P is recognized by the robot by the number of times that the corresponding cluster becomes a winner cluster.

As the robot frequently refers to a cluster for recognizing a user, a contribution degree of the cluster becomes high. This implies that a feature vector included in the cluster and a facial image which is requested for recognition have similar environmental factors (e.g., lighting conditions and pose).

To the contrary, a low contribution degree of the cluster implies that feature vectors of the cluster and a facial image have different environmental factors, and the cluster hardly influences a similarity during the recognition process. Therefore, the cluster with low contribution degree has a high possibility of being selected as an object of replacement.

Second, similar to the method of setting a centroid of a single cluster, a centroid cluster $C_p$ of the entire clusters included in the template $T_p$ of the user P is calculated using Equation 5. At this time, a cluster to be generated is included.

$$C_p = \operatorname{argmax}_{i=0,m} \frac{\sum_{j=0}^{m} S(C_i, C_j)}{m-1}, i \neq j \text{ and } C_i, C_j \in T_p \quad \text{[Equation 5]}$$

That is, if the centroid $c_p$ in the cluster $C_p$ of the template $T_p$ of the user P is a cluster having a highest similarity between other clusters when calculating similarities between the clusters included in the template $T_p$, then the cluster set as the $C_p$ is determined as the main cluster having a high contribution degree for recognizing the user P, and, at the same time, represents the most general characteristic of the user P. This implies that the characteristics of the user P may be maintained by the surrounded clusters having the high similarities to the $C_p$, even in the case where the $C_p$ is replaced.

The user feature information update unit 109 may select a cluster $C_d$ to be replaced using the replacement methods described above after a cluster is added, and thus a total number of the clusters exceeds the maximum cluster number MAX_CLUSTER_LIMIT, wherein the selected cluster $C_d$ is replaced through Equation 6.

$$C_d = \arg\max_{i=0,n} (\alpha(1-C_{ri})+(1-\alpha)C_{si}) \quad \text{[Equation 6]}$$

Where n becomes MAX_CLUSTER_LIMIT+1, which denotes a total number of clusters, $C_{ri}$ denotes the contribution degree of the i-th cluster, and $C_{si}$ denotes the mean similarity between the i-th cluster and other clusters, and $\alpha$ denotes a weight value. That is, a cluster has a high possibility of being replaced when the cluster has a low contribution degree while having a high mean similarity with other clusters.

Figure 5:
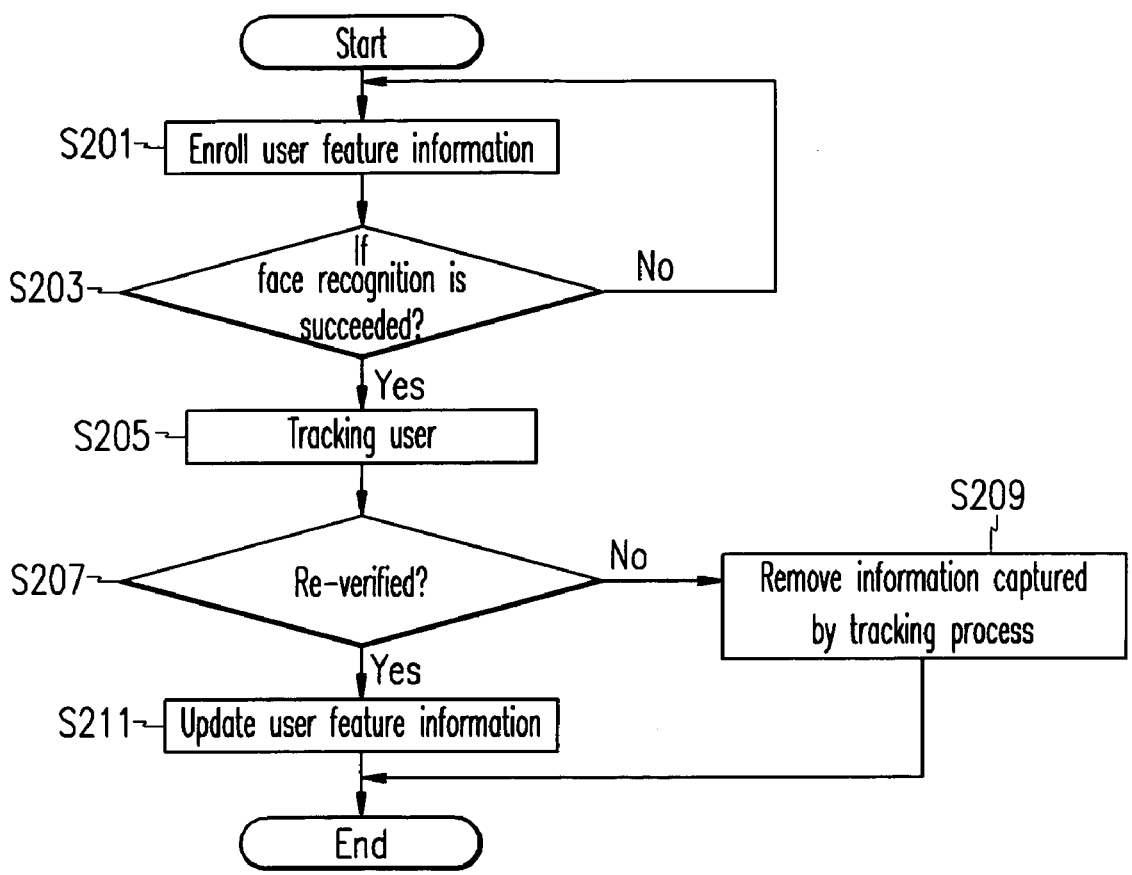
FIG. 5 is a flowchart of a user recognition process according to an exemplary embodiment of the present invention.

A method for user recognition according to an exemplary embodiment of the present invention will now be described with reference to FIG. 5.

A facial feature template of a user to be recognized is enrolled in a user recognition system, for example, a robot, in step S201. That is, a facial region is extracted from an input facial image of the user, and, as described above, a series of preprocessing stages is performed on the facial region. In addition, the preprocessed facial image is processed in a feature vector form according to various facial feature extraction algorithms.

Sequentially, a facial feature template T is stored in a form of a cluster having extracted feature vectors as its members. A primary cluster is formed in a like manner as above, and thus description of the process will not be provided.

When a enrolled user interacts with the system, a recognition process is performed on the enrolled user in step S203. That is, a facial region is extracted from a facial image of a user to be recognized, and a series of preprocessing stages is performed on the corresponding image. In addition, a feature vector $F_q$ is extracted from the preprocessed facial image, and a similarity between a facial feature template of the enrolled user and the feature vector $F_q$ is calculated.

When n templates are enrolled in the system, n similarities are calculated between the extracted $F_q$ and the respective templates. When a highest similarity among the n similarities is greater than the recognition threshold value θr, a user having the highest similarity is recognized as the corresponding user.

When an environment in which a user interacts with the robot is continually changing, a tracking process is performed on a currently recognized user in order to continually track the user in step S205. That is, a tracking process is performed on facial images inputted after the highest similarity between the feature vector $F_q$ used for the recognition process and the enrolled template exceeds the recognition threshold value, and the images captured during the tracking process are stored in the temporary buffer. In addition, the tracking process is terminated when a user to be recognized is out of the robot's vision or another user is shown up.

When the tracking process is terminated, a re-verification process is performed to verify whether the image stored in the temporary buffer corresponds to the image of the recognized user in step S207. That is, a feature vector is extracted from the captured images, and a similarity between the extracted feature vector and a template $T_p$ of the recognized user is calculated.

When the similarity is greater than the template update threshold value θt, the template $T_p$ is updated with the captured images in step S211.

At this time, the template update threshold value θt is set more strictly than the recognition threshold value θr. When the similarity is not greater than the template update threshold value θt, the captured images are removed from the buffer and the template update process is not performed in step S209.

Although the embodiment of the present invention is described in detail in connection with face recognition, other physical features may also be applied for recognizing the identity of the user according to another embodiment of the present invention. In addition, elements of the system may be combined into a single element or segmented depending on functions. In addition, the above-described recognition system may be applied riot only to a robot system but also to any system that needs to recognize an identity of a user.

It will be clear that the present invention is well adapted to attain the ends and advantages mentioned as well as those inherent therein. While a various embodiments including the presently preferred one has been described for purposes of this disclosure, various changes and modifications may be made, which are well within the scope of the present invention. Numerous other changes may be made which will readily suggest themselves to those skilled in the art and which are encompassed in the spirit of the invention disclosed and as defined in the appended claims.

What is claimed is:

1. A method of recognizing an input user from an input image, the method comprising: using a processor to perform
    a) capturing the input image of the input user using an image capture device and extracting a user feature vector from the input image captured by the image capture device;
    b) calculating a similarity between the extracted user feature vector and a user feature template of an enrolled user, the user feature template being user feature information that includes a plurality of clusters of the enrolled user, each of the clusters having a user feature vector as a member of the cluster, wherein the similarity is calculated by comparing a similarity between a centroid of each of the plurality of clusters of the user feature template and the user feature vector; and
    c) recognizing the enrolled user of the feature template as the input user when the similarity between the extracted user feature vector and the feature template exceeds a predetermined recognition threshold value,
    wherein each of the clusters represents a different facial condition of the same enrolled user,
    wherein when a given user is recognized in c), the method further comprises:
    d) capturing tracked input images of the recognized user after the recognized user has been determined to be an enrolled user by tracking the recognized user using the image capture device;
    e) extracting a feature vector from the captured image and re-verifying whether the captured image corresponds to an image of the recognized user; and
    f) when the input image is re-verified to be the same as the image of the recognized user in e), updating the user feature template of the recognized user with extracted feature vectors of the captured images
    wherein f) comprises:
    f-1) calculating a similarity between an extracted feature vector of the captured image and a cluster of the user feature template of the recognized user;
    f-2) searching for a winner cluster having a highest similarity, and calculating a similarity between the corresponding extracted feature vector and the winner cluster and the predetermined cluster classification threshold value; and
    f-3) including the corresponding extracted feature vector to the winner cluster as a member of the winner cluster when the similarity between the corresponding extracted feature vector and the winner cluster is greater than the predetermined cluster classification threshold value
    wherein after f-2), when the similarity between the corresponding extracted feature vector and the winner cluster is less than the predetermined cluster classification threshold value, the method further comprises generating a cluster and including the corresponding extracted feature vector to the generated cluster as a member of the generated cluster,
    wherein when a cluster is added and a total number of clusters exceeds a predetermined maximum number of cluster members, the method further comprises:
        selecting a cluster to be removed from among clusters of the user feature template based on at least more than one cluster having a highest mean similarity with other clusters and the least referred cluster in the user recognition process; and
        removing the selected cluster from the user feature template,
        wherein the cluster to be removed is selected by $$C_d = \arg\max_{i=0_1 n}(\alpha(1 - C_{ri}) + (1 - \alpha)C_{si})$$

wherein Cri is a contribution degree of the i-th cluster, Csi is a mean similarity between i-th cluster and other clusters, and α is a weight value.

2. The method of claim 1, further comprising:
    i) extracting one or more user feature vectors from the input image, generating at least one cluster having at least one of the user feature vectors as a member of the cluster, and enrolling a user feature template including the generated at least one cluster.

3. The method of claim 2, wherein the cluster having a feature vector as a member of the cluster is generated at least once, and a similarity between the feature vector and the centroid of each cluster exceeds a predetermined cluster classification threshold value.

4. The method of claim 2, wherein i) comprises:
  i-1) setting a first feature vector among the feature vectors extracted from the input image as a member of a first cluster and setting the first feature vector as a first centroid of the first cluster;
  i-2) when there exists one or more additional feature vectors in addition to the first feature vector, calculating similarity between each one of the plurality of feature vectors and the centroid of the first cluster;
  i-3) after the step i-2), setting every feature vector with the calculated similarity exceeding the predetermined cluster classification threshold value as a member of the first cluster; and
  i-4) after the step i-2), generating a second cluster having every feature vector with the calculated similarity not exceeding the predetermined cluster classification threshold value as a member of the second cluster.

5. The method of claim 1, wherein b) further comprises calculating similarities between each of the clusters and the extracted user feature vector when one user feature template includes a plurality of clusters, and calculating a higher similarity as a similarity between the corresponding user feature template and the extracted user feature vector.

6. The method of claim 1, wherein e) comprises:
  e-1) extracting a feature vector from the captured images;
  e-2) calculating a similarity between the extracted feature vector and the user feature template of the recognized user;
  e-3) re-verifying whether the captured images correspond to the image of the recognized user when the calculated similarity exceeds a predetermined update threshold value.

7. The method of claim 6, wherein the update threshold value is set to be greater than the recognition threshold value.

8. The method of claim 1, wherein after f-3), the method further comprises:
  f-4) setting a centroid of the winner cluster having the additional member; and
  f-5) removing a member corresponding to the reset centroid from the winner cluster when a total number of members of the winner cluster exceeds a predetermined maximum number of cluster members.

9. The method of claim 3 or 4 or 8, wherein when the cluster includes a plurality of members of feature vectors, the centroid of the cluster corresponds to a feature vector having the greatest sum of similarities of the centroid of the cluster and other members of the cluster.

10. The method of claim 9, wherein the centroid is retrieved from $$C_k = \text{argmax}_{i=0,m} \sum_{j=0}^{m} S(F_i, F_j), \ i \ne j \text{ and } F_i, F_j \in C_k$$

wherein Ck is a cluster, $c_k$ is a centroid of the cluster Ck, and Fi and Fj: are feature vectors.

11. The method of claim 1 or 5 or 6, wherein the similarity between the user feature template and the user feature vector is calculated by $$S_k = max_{i=0,m} S(F_q, c_i), \ c_i \in C_i \text{ and } C_i \in T_k$$

wherein Sk is the similarity, Ci is a cluster, $C_i$: is a centroid of the cluster Ci, and Fq is a feature vector.

12. The method of claim 1, wherein the cluster having the highest mean similarity with another cluster among the clusters of the user feature template is calculated by $$C_p = \text{argmax}_{i=0,m} \frac{\sum_{j=0}^{m} S(C_i, C_j)}{m-1}, \ i \ne j \text{ and } C_i, C_j \in T_p$$

wherein Tp is a template of a user P, Ci and Cj are clusters of the template Tp, and Cp is a centroid cluster of the template Tp.

13. A system recognizing an input user from an input image, the system comprising: the system associated with processor,
  an image input unit capturing the input image of the input user;
  a database storing a user feature template as user feature information;
  a feature vector calculator extracting a user feature vector from the input image;
  a user feature information enroller generating a plurality of clusters for a user, each of the clusters having a feature vector as a member of the cluster, and storing a user feature template for the user including the plurality of clusters in the database; and
  a user recognizer calculating similarities between the extracted feature vector of the input image and a centroid of each of the plurality of clusters of the stored user feature template of an enrolled user, and recognizing a user of the user feature template as the input user of the input image when the similarity exceeds a predetermined recognition threshold value,
  wherein each of the clusters represents a different facial condition of the same enrolled user
  a tracking unit capturing an input image of a user when the user is recognized;
  a re-verification unit calculating a feature vector from the captured image, and calculating a similarity between the feature vector and a user feature template of the recognized user, and
  re-verifying whether the captured image corresponds to an input image of the recognized user when the similarity exceeds a predetermined update threshold value; and
  a user feature information update unit updating a user feature template stored in the database with the captured image when the captured image corresponds to the input image of the recognized user
  wherein the update threshold value is set to be greater than the recognition threshold value
  wherein the user feature information update unit
    calculates similarities between feature vectors of the captured images and clusters of a user feature template of the recognized user and searches for a winner cluster having the highest similarity, and compares a similarity between the corresponding feature vector and the winner cluster and a predetermined cluster classification threshold value,
    adds the corresponding feature vector as a member of the winner cluster when a similarity between the corresponding feature vector and the winner cluster is greater than the predetermined cluster classification threshold value, and
    generates a cluster and adds the corresponding feature vector as a member of the generated cluster when the similarity between the corresponding feature vector and the winner cluster is not greater than the predetermined cluster classification threshold value
selects a cluster to be removed from among clusters of the user feature template based on at least more than one cluster having the highest mean similarity with other clusters and the least referred cluster in the user recognition process, and removes the selected cluster from the user feature template when a cluster is added and a total number of clusters exceed the predetermined maximum number of cluster members
wherein a cluster to be removed is selected by the following equation:

$$C_d = \arg\ \max_{i=0_1 n}(\alpha(1 - C_{ri}) + (1 - \alpha)C_{si})$$

wherein Cri is a contribution degree of the i-th cluster, Csi is a mean similarity between the i-th cluster and other clusters, and α is a weight value.

14. The system of claim 13, wherein the user recognizer compares a similarity between the extracted feature vector and the stored user feature template and controls the user feature information enroller to generate a user feature template and store the cluster in the database when the similarity does not exceed the recognition threshold value.

15. The system of claim 13 or 14, wherein the cluster having a feature vector as a member of the cluster is generated at least once, and a similarity between the feature vector and the centroid of each cluster exceeds a predetermined cluster classification threshold value.

16. The system of claim 13 or 14, wherein the user recognizer
calculates a highest similarity between the user feature template and the extracted user feature vector by calculating similarities between each of the centroids of each cluster and the extracted user feature vector when a user feature template includes a plurality of clusters, and
when the highest similarity exceeds the recognition threshold value, recognizes an enrolled user of the user feature template as the input user of the input image.

17. The system of claim 13, wherein the user feature information update unit sets a centroid of the cluster including the additional member, and removes a member corresponding to the reset centroid from the winner cluster when total members of the winner cluster exceed a predetermined maximum number of cluster members.

18. The system of claim 17, wherein, when the cluster has a plurality of members, a centroid of the cluster corresponds to a feature vector having the greatest sum of similarities between the feature vector and the plurality of members of the cluster, and the centroid is derived from the following equation:

$$C_k = \mathrm{argmax}_{i=0,m} \sum_{j=0}^{m} S(F_i, F_j),\ i \neq j \text{ and } F_i, F_j \in C_k$$

wherein Ck is a cluster, $c_k$ is a centroid of the cluster Ck, and Fi and Fj are feature vectors.

19. The system of claim 13, wherein a similarity between the user feature template and the user feature vector is calculated from the following equation:

$$S_k = m\ ax_{i=0,m} S(F_q, c_i),\ c_i \in C_i and\ C_i \in T_k$$

wherein Sk is a similarity, Ci is a cluster, $c_i$ is a centroid of the cluster Ci, and Fq is a feature vector.

20. The system of claim 13, wherein a cluster having the highest mean similarity among other clusters of the user feature template is calculated from the following equation:

$$C_p = \mathrm{argmax}_{i=0,m} \frac{\sum_{j=0}^{m} S(C_i, C_j)}{m-1} i \neq j \text{ and } C_i, C_j \in T_p$$

wherein Tp is a template of user P, Ci, Cj are clusters of the template Tp, and the cluster Cp is a centroid cluster of the template Tp.

* * * * *